May 9, 1961   L. P. GARVEY ET AL   2,983,545
VEHICLE SEAT POSITIONING APPARATUS
Filed June 30, 1958   8 Sheets-Sheet 1

INVENTORS
Louis P. Garvey &
Clyde H. Schamel
BY E. W. Christen
ATTORNEY

May 9, 1961   L. P. GARVEY ET AL   2,983,545
VEHICLE SEAT POSITIONING APPARATUS
Filed June 30, 1958   8 Sheets-Sheet 4

INVENTORS
Louis P. Garvey &
Clyde H. Schamel
BY E. W. Christen
ATTORNEY

United States Patent Office 2,983,545
Patented May 9, 1961

2,983,545

VEHICLE SEAT POSITIONING APPARATUS

Louis P. Garvey, Birmingham, and Clyde H. Schamel, Royal Oak, Mich., assignors to General Motors Corporation, Detroit, Mich., a corporation of Delaware Filed June 30, 1958, Ser. No. 745,409

16 Claims. (Cl. 296—65)

This invention relates to seat positioning apparatus and more particularly to power operated vehicle seat positioning apparatus which is automatically controlled by predetermined conditions to displace the seat to predetermined positions facilitating passenger exit and entrance and to return the seat to its initial starting position.

The apparatus of this invention includes a power operated seat adjusting mechanism of the six-way type to adjust the seat in horizontal fore and aft directions of the vehicle and to selectively and independently adjust the front and rear portions of the seat.

The apparatus of this invention further includes an automatic seat control means which is controlled by predetermined conditions to displace the seat to predetermined positions facilitating driver and both front and rear seat passenger exit and entrance. The automatic control means further includes a seat position memory means which stores knowledge of the initial starting position of the seat and returns the seat to its initial starting position after displacement thereof. Thus, if the driver is seated on the front seat and opens a front door, the seat will move to its terminal horizontal rearward position and its terminal vertical downward position to provide for easier exit from the vehicle. If the driver then leaves the vehicle and closes the front door, the seat remains in this position. When the driver again re-enters the vehicle, seats himself on the front seat and closes the front door, the seat returns to its initial starting position.

If the driver is seated on the front seat and a front seat passenger opens a front door, the seat will move to its terminal horizontal rearward position and its terminal vertical downward position to provide for easier exit of the passenger from the vehicle. If the passenger then leaves the vehicle and closes the front door, the seat will return to its initial starting position.

The automatic control means further includes a switch on either side of the seat back which may be operated by a rear seat passenger in order to displace the seat to a horizontal position midway between its rear and forward terminal horizontal positions. Thus, if a rear seat passenger desires to leave the vehicle, the driver or front seat passenger opens either front door and the rear seat passenger then operates either one of the seat back switches to displace the seat. The seat will then move to its horizontal midway position to provide for ease of exit. If the driver or front seat passenger then closes the front door, the seat will return to its initial starting position.

The apparatus of the invention also includes a manual control means which may be operated by the driver to move the seat to whatever horizontal or vertical position desired. The manual control means is also interconnected with the automatic control means so that the manual control means provides an override over the automatic control means. Thus, if one driver leaves the vehicle and then another driver re-enters the vehicle, the seat will start to return to its initial starting position, as previously described. However, if the new driver of the vehicle believes that the seat should be adjusted in an opposite direction or in the same direction, whether horizontal or vertical, he can operate the manual control means in order to move the seat in any direction he so desires. Upon operation of the manual control means during an automatic cycle sequence, the automatic control means is overridden and does not function. However, upon release of the manual control means, the automatic control means will then again operate to return the seat toward the position which has been stored in the seat position memory means. This position will be the same as the initial starting position. If the driver wishes to obtain a new stored position he must operate the manual control means after the automatic cycle sequence is over.

The primary object of this invention is to provide a new and improved seat positioning apparatus. Another object of this invention is to provide a new and improved vehicle seat positioning apparatus which is automatically controlled by predetermined conditions to displace the seat to predetermined positions facilitating passenger exit and entrance. A further object of this invention is to provide a new and improved seat positioning apparatus which includes a seat position memory means to store knowledge of the initial position of the seat in order to return the seat to this initial position after displacement of the seat to predetermined positions. Yet, another object of this invention is to provide a new and improved seat positioning apparatus which includes manual control means and seat position memory means wherein the seat position memory means is operative to store knowledge as to the initial position of the seat prior to displacement thereof to predetermined positions in order to return the seat to its initial starting position unless overridden by the manual control means.

These and other objects of this invention will be readily apparent from the following specification and drawings, in which.

Before proceeding with a description of the seat positioning apparatus of this invention, it will be understood that each of the spaced seat adjusters is of the same structure unless otherwise noted. Therefore, only the left hand seat adjuster will be particularly described and primed numerals, where used, indicate the same parts of the right hand seat adjuster. It will be further understood that the parts indicated by numerals and their primes are aligned transversely of the seat.

Figure 1:
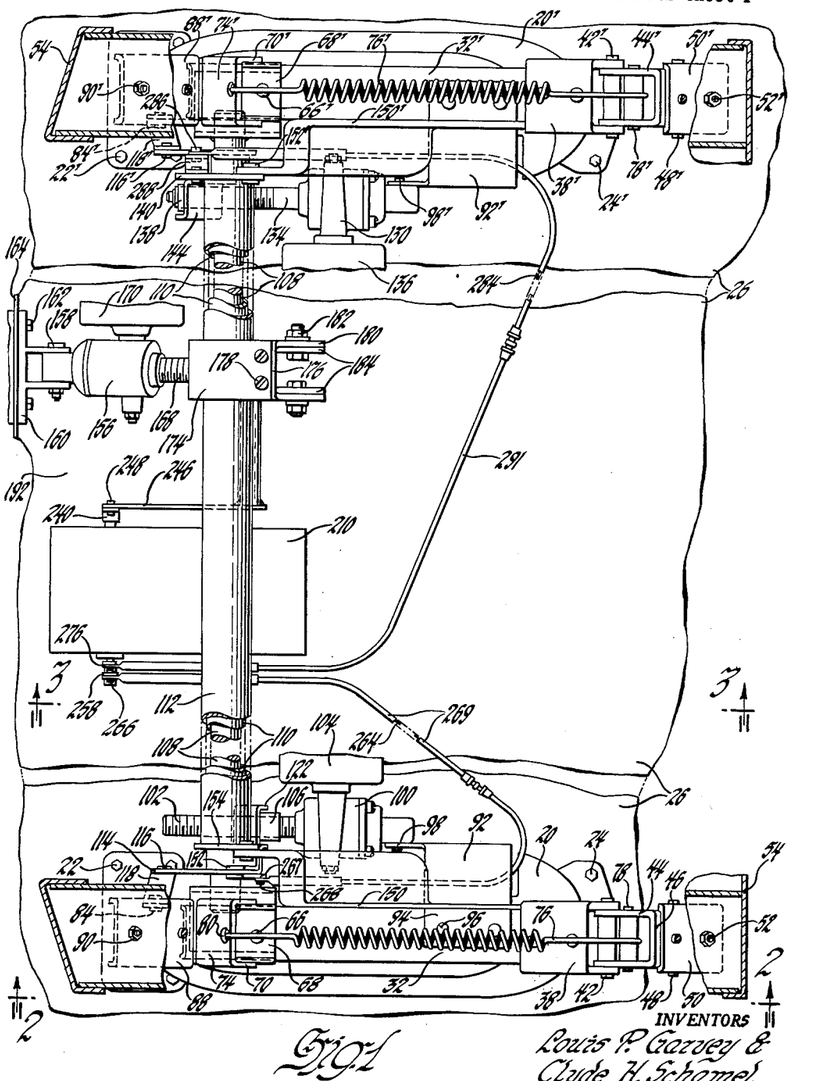
Figure 1 is a plan view of a seat adjusting mechanism according to this invention.
Figure 2:
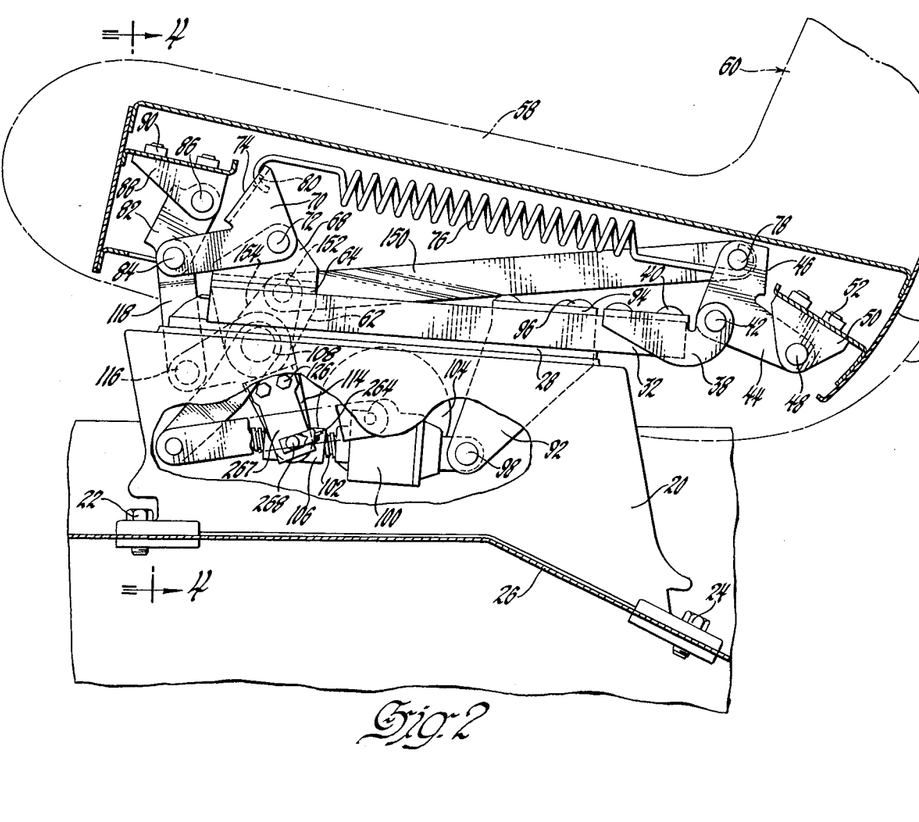
Figure 2 is a side elevational view, partially broken away, of the seat adjusting mechanism taken on the plane indicated by line 2—2 of Figure 1.
Figure 4:
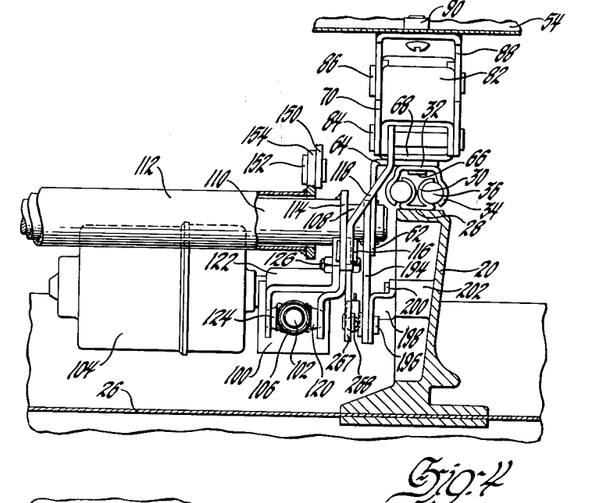
Figure 4 is a front elevational view, partially broken away, taken on the plane indicated by line 4—4 of Figure 2.

Referring now particularly to Figures 1, 2 and 4 of the drawings, the left hand seat adjuster includes a pedestal support 20 of cast brass or otherwise which is bolted at 22 and 24 at the front and rear edges thereof, respectively, to the vehicle floor pan 26. The lower track 28 of the seat adjuster slide structure is fixed in a suitable manner to the upper edge of the support 20 and includes oppositely facing arcuate side walls 30 as may be seen particularly in Figure 4. The upper track 32 of the seat adjuster slide structure surrounds the lower track 28 and is provided with a pair of oppositely facing arcuate side walls 34 which cooperate with side walls 30 of the lower track in providing a pair of spaced races for a number of ball bearings 36 which slidably mount the upper track 32 on the lower track 28. Thus, the upper track 32 may be moved in a horizontal fore and aft direction with respect to the lower track 28 in order to adjust the horizontal position of the upper track.

A generally U-shaped bracket 38 has its base riveted or otherwise secured at 40 to the base of the upper track 32 adjacent the rear end thereof. Bracket 38 includes a pair of spaced ears which extend rearwardly of the upper track and support a pin 42 extending therebetween. A pair of rear vertical bell cranks 44 are pivotally mounted on pin 42 and are interconnected by a web 46. The lower leg of each of the bell cranks is pivoted at 48 to a leg of a U-shaped bracket 50. Bracket 50 is bolted or otherwise secured at 52 to the rear portion of the seat frame 54 which supports the vehicle seat 56. The seat 56, as shown, includes a seat bottom 58 and a seat back 60 and is of known construction.

An angle bracket 62, Figures 2 and 4, has one leg 64 thereof riveted or otherwise secured at 66 to the base of the upper track 32 adjacent the forward edge thereof. A U-shaped bracket 68 has its base bearing against the leg 64 of bracket 62 and is secured to the upper track by means of the same rivets or otherwise 66 which secures bracket 62 to the upper track. The front vertical bell cranks 70 are pivoted at 72 to each of the legs of bracket 68, with the bell cranks being interconnected by a web 74. A vertical assist spring 76 has its rear end hooked around a pin 78 which extends between the rear vertical bell cranks 44 and its forward end hooked within an opening 80 in the web 74 interconnecting the front vertical bell cranks 70. A yoke type link 82 is pivoted at 84 at one end thereof to each of the bell cranks 70. The other end of the yoke type link is pivoted at 86 to each leg of a generally U-shaped bracket 88. Bracket 88 is bolted or otherwise secured at 90 to the seat frame 54 at the forward portion thereof.

Referring now particularly to Figures 2 and 4, the power operation of the front portion of the seat in vertical directions will be described. An angle bracket 92 has one leg 94 thereof riveted or otherwise secured at 96 to the base of the upper track 32 adjacent and forward of bracket 38. The other leg of bracket 92 is pivoted at 98 to one end of a power actuator 100 which includes a lead screw 102 driven by a reversible electric motor 104. A nut 106 includes an internally threaded bore which receives the lead screw 102. Since the nut is held from rotation, as will be described, rotation of the lead screw will cause the nut to travel therealong in either direction depending on the direction of rotation thereof. An inner equalizer rod 108 extends between the brackets 62 and 62' of each of the seat adjusters and is rotatably mounted at each end within suitable openings therein. An intermediate equalizer tube 110 and an outer equalizer tube 112 are rotatably mounted on the equalizer rod 108. Thus, the inner equalizer rod 108 and the intermediate and outer equalizer tubes 110 and 112 are rotatably supported for independent movement about an axis which is transverse of the seat adjacent the front portion thereof.

Referring now particularly to Figure 2 or the drawings, a bell crank lever 114 is provided with a central opening of sufficient diameter to receive the equalizer rod 108 and is spot welded or otherwise secured to the right hand end of the intermediate equalizer tube 110. The upper end of the lever is pivoted at 116 to one end of a shiftable link 118, the other end of which is pivoted at 84 to the inboard rear bell crank and the lower end of link 82. The lower offset end of the lever 114 is pivoted to a trunnion 120 which extends outboard from one side of the nut 106. An offset lever 122 is pivoted to a trunnion 124 which extends inboard from the opposite side of nut 106 and is bolted at 126 to lever 114. The offset lever 122 and lever 114 surround the nut 106 and are pivotally secured thereto so that the nut is secured against rotation and must travel along the lead screw 102 upon rotation thereof.

Assuming now that motor 104 drives lead screw 102 in a direction so that the nut 106 moves rearwardly therealong, or to the right as viewed in Figure 2, the lever 114 and the intermediate equalizer tube 110 will rotate in a counterclockwise direction about the axis of rotation of rod 108. As the lever 114 moves in this direction, it will shift link 118 downwardly to swing the front vertical bell cranks 70 in a counterclockwise direction about their pivots 72 on the bracket 68. Movement of the bell cranks 70 in this direction will shift link 82 downwardly to lower the front right hand portion of the seat. Similarly, if the lead screw 102 is driven in the opposite direction by motor 104, the nut 106 will travel therealong in the opposite direction or to the left, as viewed in Figure 2, to rotate the equalizer tube 110 and lever 114 clockwise and shift link 118 upwardly. This will swing the front vertical bell cranks 70 clockwise about their pivots 72 to shift link 82 upwardly and raise the right hand front portion of the seat.

Figure 3:
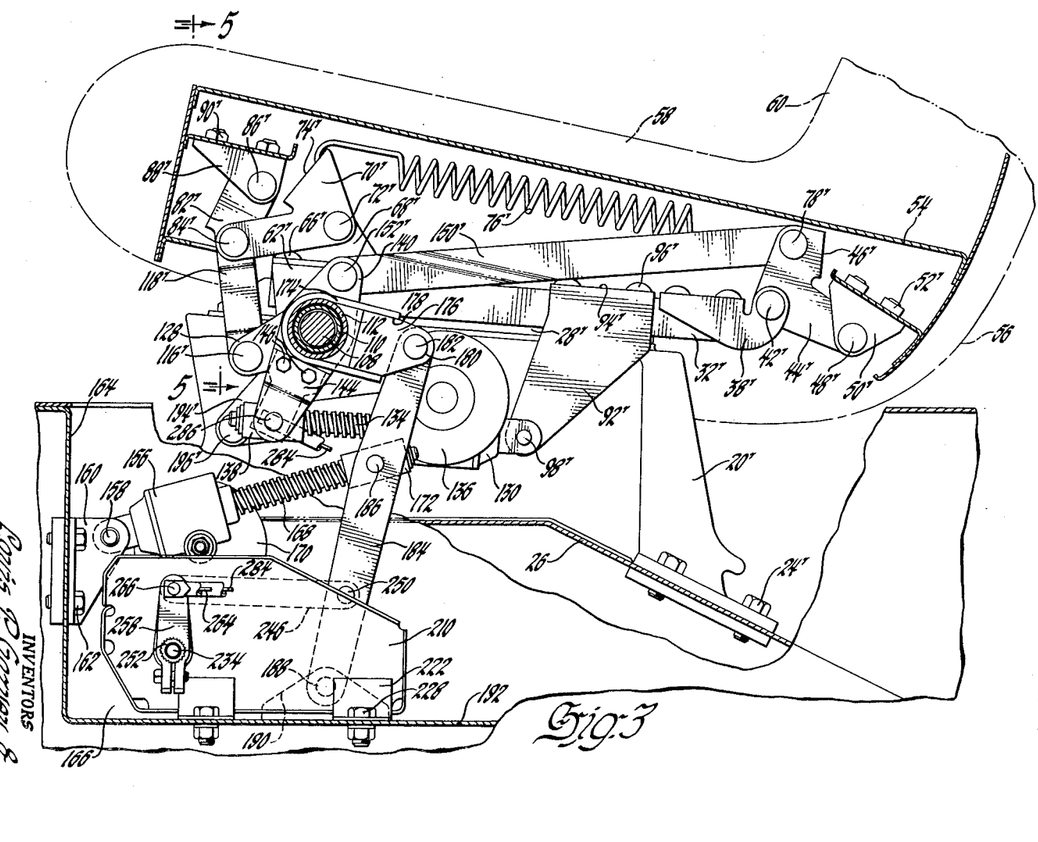
Figure 3 is a side elevational view, partially in section, taken on the plane indicated by line 3—3 of Figure 1.
Figure 5:
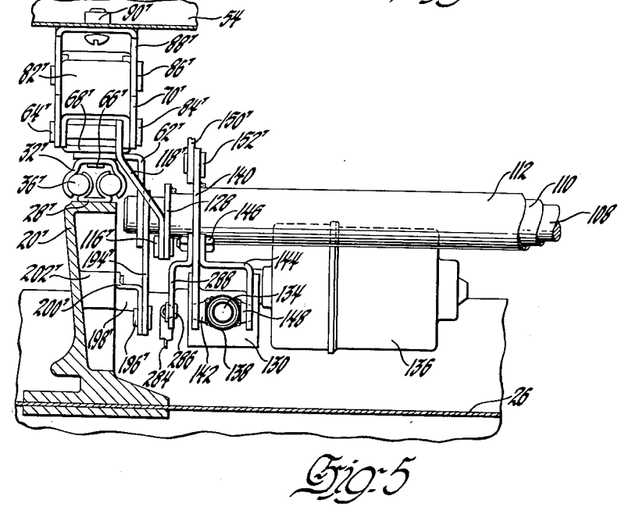
Figure 5 is a front elevational view taken on the plane indicated by line 5—5 of Figure 3.

Since the equalizer tube 110 spans the seat, as previously mentioned, the left hand front portion of the seat may be vertically adjusted simultaneously with the right hand front portion in a manner as will now be described. Referring now particularly to Figures 3 and 5 of the drawings, a lever 128 is provided with an opening at one end thereof of a size to receive the inner equalizer rod 108 and is spot welded or otherwise secured to the left hand end of the equalizer tube 110. The lever 128 is of the same length as the upper leg of bell crank 114 so that the distance between the axis of tube 110 and pivot 116 at the right hand side of the seat is the same as the distance between the axis of tube 110 and pivot 116' at the left hand side of the seat. The pivot 72', 84' and 86' are also aligned transversely of the seat with their corresponding pivots on the right hand side of the seat. Thus, vertical adjustment of the front portion of the seat at the right hand side thereof will result in simultaneous vertical adjustment of the front portion of the seat at the left hand side thereof by means of the tube 110 and the corresponding linkage arrangement which are aligned transversely of the seat. Thus, the equalizer tube 110 acts to insure that both sides of the seat will be simultaneously vertically adjusted and also acts to transfer power from the power actuator at the left hand side of the seat to the right and left hand linkage arrangements.

Referring now particularly to Figures 3 and 5, the power operation of the rear portion of the seat in vertical directions will be described. A power actuator 130 similar to the power actuator 100 is pivoted at one end thereof at 98' to the bracket 92' which is fixed at 94' to the left hand upper track 32'. The power actuator includes a lead screw 134 driven by a reversible electric motor 136 similar to the electric motor 104. A nut 138 similar to nut 106 is provided with an internally threaded bore which mates with the thread of the lead screw so that rotation of the lead screw will cause the nut to travel therealong since the nut is held against rotation as will be described. A lever 140 is provided with a central opening of a size to receive the equalizer tube 110 and is welded or otherwise secured to the left hand end of the outer equalizer tube 112, as shown particularly in Figure 5. The lower end of the lever 140 is pivoted to a trunnion 142 fixedly secured to the outboard side of the nut 138. An offset lever 144 bolted at 146 to the lever 140 is pivoted to a trunnion 148 fixedly secured to the inboard side of nut 138 opposite the trunnion 142. Thus, the lever 140 and the lever 144 provide a yoke which pivotally receives the nut 138.

Referring now particularly to Figure 3 of the drawings, a shiftable link 150' is pivotally secured at 152' at one end thereof to the upper end of the lever 140 and the other end of the link is pivotally secured to the pin 78' extending between the rear vertical bell cranks 44'.

The outer equalizer tube 112 spans the seat transversely thereof and is rotatable about the axis of equalizer rod 108, as previously described. This tube transfers power from the power actuator 130 to the rear vertical bell cranks 44' at the right hand side of the seat and also transfers power to the rear vertical bell cranks 44 at the left hand side of the seat. Referring now particularly to Figures 2 and 4 of the drawings, the connection between the equalizer tube 112 and the left hand rear vertical bell cranks 44 will be described. An arm 154 is provided with an opening at one end thereof of a size to receive the equalizer tube 110 and is spot welded or otherwise secured to the right hand end of the equalizer tube 112. The distance between the axis of rotation of arm 154 and pivot 152 at the left hand side of the seat is the same as the distance between the axis of rotation of lever 140 and pivot 152' at the right hand side of the seat so that the pivots 152 and 152' are aligned transversely of the seat. The link 150 at the left hand side of the seat interconnects arm 154 and the pin 78 extending between the left hand rear vertical bell cranks 44.

Referring now to Figures 2 and 3 of the drawings, if the motor 136 drives the lead screw 134 in a direction to cause the nut 138 to be moved rearwardly or to the right therealong, the lever 140 and equalizer tube 112 together with arm 154 rotate in a counterclockwise direction about the axis of rod 108. As the lever 140 and arm 154 rotate in this direction, the links 150' and 150 will be shifted forwardly of the seat to in turn swing the rear vertical bell cranks 44 and 44' in a clockwise direction about their pivots 42' and 42 on the upper tracks of the seat adjusters to raise the rear portion of the seat at the left and right hand sides thereof.

Vertical movement of the rear portion of the seat in a downward direction is similar, although the motor 136 must drive the lead screw 134 in the reverse direction so that the nut 138 will move forwardly or to the left therealong to rotate lever 140 and the equalizer tube 112 together with arm 154 in a clockwise direction. This will shift the links 150' and 150 rearwardly of the seat to swing the bell cranks 44' and 44 in a clockwise direction about their pivotal connections 42' and 42 to lower the rear portion of the seat.

It will be noted that the rear bell cranks 44 and 44' are pivoted directly to the seat at 48 and 48', respectively, while the front vertical bell cranks 70 and 70' are pivoted to the seat through the links 82 and 82'. The links 82 and 82' provide a lost motion connection so that the front and rear portions of the seat may be independently adjusted in vertical directions without binding at the pivots 48 and 48'.

Referring now particularly to Figures 1 and 3 of the drawings, the power operation of the seat in horizontal directions will be described. A power actuator 156 is pivoted at one end thereof at 158 to a U-shaped bracket 160 which is bolted or otherwise fixedly secured at 162 to the forward wall 164 of a well 166 in the vehicle floor pan 26. The actuator 156 includes a lead screw 168 which is driven by a reversible electric motor 170. A nut 172, Figure 3, is provided with an internally threaded bore which mates with the thread of the lead screw 168 so that the nut will travel along the lead screw upon rotation thereof if the nut is held against rotation. A U-shaped bracket 174 rotatably surrounds the outer equalizer tube 112 and the ends of the bracket receive a block 176 which is secured to each leg of the bracket at 178, as may be seen particularly in Figure 1. The block 176 is provided with a pair of extending ears 180, with each ear being pivoted at 182 to the upper end of a lever 184. The levers 184 are pivotally secured intermediate the ends thereof to trunnions 186 which extend outwardly from opposite sides of the nut 172. The lower end of each of the levers 184 is pivotally secured at 188 to a leg of a U-shaped bracket 190 which is secured in a suitable manner to the lower wall 192 of well 166.

The inner equalizer rod 108 controls the horizontal movement of both the right and left hand seat adjusters as will now be described. Referring particularly to Figures 4 and 5 of the drawings, the interconnection between the equalizer rod 108 and the right hand and left hand seat adjusters will now be described. Arms 194 and 194' are provided with an opening at one end thereof of a size to receive the equalizer rod 108 and are spot welded or otherwise secured to the rod adjacent the right and left hand ends thereof, respectively. The other end of each arm is pivotally secured at 196 and 196', respectively, to one end of offset links 198 and 198', the other end of which is pivoted at 200 and 200', respectively, within bosses 202 and 202', respectively, of the pedestal support 20 and 20', respectively.

Before proceeding with a description of horizontal movement of the seat, it will be remembered that the linkage controlling vertical movement of the front and rear portions of the seat, the equalizing tubes and rod, and the power actuators 100 and 130 are carried by the upper tracks 32 and 32' of the right and left hand seat adjusters. It will also be remembered that there is no direct connection between the levers 184 and the equalizer rod 108 since the U-shaped bracket 174 is rotatably mounted on the outer equalizer tube 112.

Referring now particularly to Figure 3 of the drawings, if the motor 170 drives the lead screw 168 in a direction to cause the nut 172 to travel forwardly or to the left therealong, each of the levers 184 will be rotated in a counterclockwise direction about their pivotal connections 188 to the floor pan. As the levers move in this direction, they will push the block 176 and bracket 174 forwardly and in turn move both of the equalizer tubes 110 and 112 and the equalizer rod 108 forwardly to move each of the upper tracks 32 and 32' of the left and right hand seat adjusters forwardly along the lower tracks 28 and 28' thereof through the brackets 62 and 62' which are secured to the upper tracks 32 and 32' and which are rotatably secured to the support rod 108. Since the length of the levers 184 and the distance between the pivotal axis of rod 108 and pivots 182 is greater than the length between pivots 188 and the pivotal axis of rod 108, the levers cannot swing relative to their pivots 188 without moving the equalizer tubes 110 and 112 and rod 108 forwardly.

The arms 194 and 194' and the offset links 198 and 198' provide an equalizing means to insure that each of the upper tracks 32 and 32' will move an equal distance relative to the lower tracks as the equalizer tubes and the rod 108 are pushed forwardly by the levers 184. These arms and the links are necessary since the horizontal force is applied intermediate the ends of the equalizer tubes and the equalizer rod and tends to bend the tubes and rod so that the ends thereof may be deflected unequally rearwardly. Therefore, since the ends of the equalizer rod control the movement of the upper tracks 32 and 32', the upper tracks would not move an equal distance if the ends of rod 108 were unequally deflected.

Horizontal movement of the seat in a rearward direction is similar to that previously described, except that the motor 170 is now operated to rotate lead screw 168 in a reverse direction to cause the nut 172 to move rearwardly or to the right therealong as viewed in Figure 3. This movement of nut 172 will swing the levers 184 clockwise about the pivotal connections 188 thereof to the floor pan to cause the levers to pull the intermediate and outer equalizer tubes 110 and 112, respectively, and the equalizer rod 108 rearwardly and in turn cause both the upper tracks 32 and 32' of the left and right hand seat adjusters to move rearwardly relative to the lower tracks 28 and 28' thereof. The arms 194 and 194' and the offset links 198 and 198' again act to equalize movement of the upper tracks so that both will move through the same horizontal distance.

Figures 6, 7:
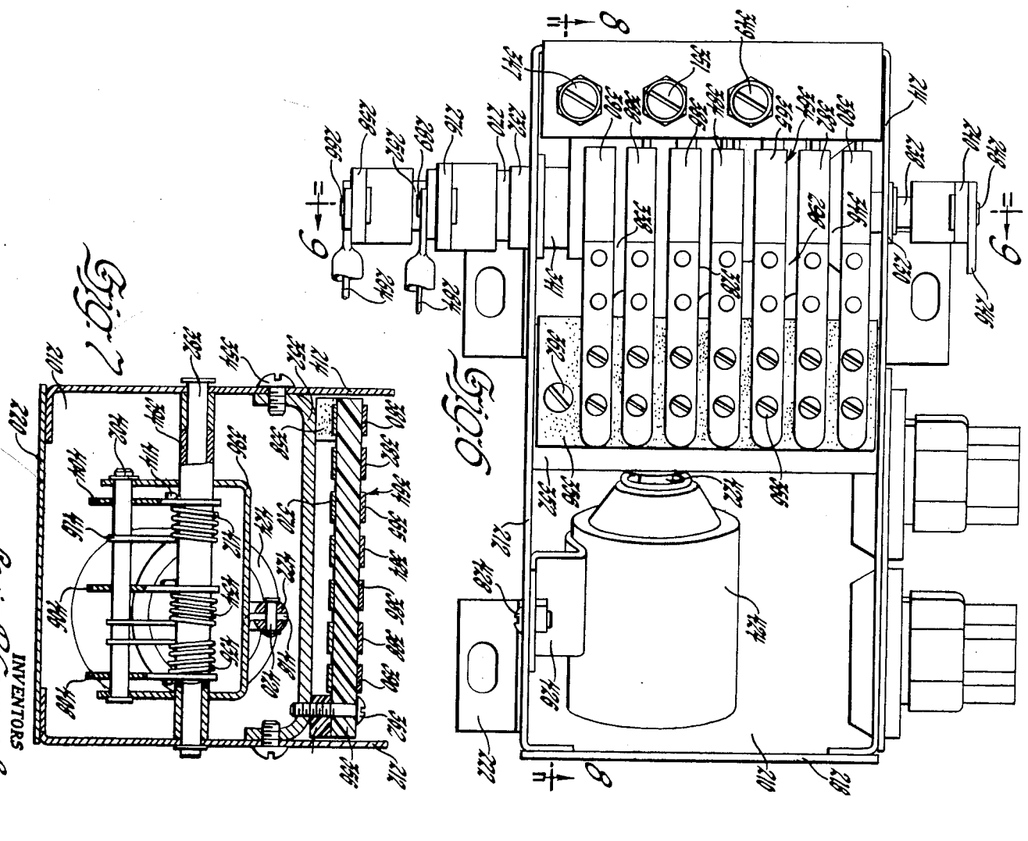
Figure 6 is a top plan view of the seat position memory means.
Figure 7 is a sectional view taken on the plane indicated by line 7—7 of Figure 8.

Referring now particularly to Figures 6 through 11 of the drawings, the seat position memory means will be described. The memory means includes a housing 210 having side walls 212 and 214, front and rear walls 216 and 218 and a bottom wall 220. Referring now particularly to Figure 6 of the drawings, a number of angle brackets 222 are spot welded or otherwise secured to each of the side walls 212 and 214. As may be seen particularly in Figure 3 of the drawings, the housing 210 of the memory control means fits within the well 166 of the floor pan 26 and bolts 228 extend through the angle brackets 222 and the lower wall 192 of the well in order to fixedly mount the memory control means within the well.

Figure 9:
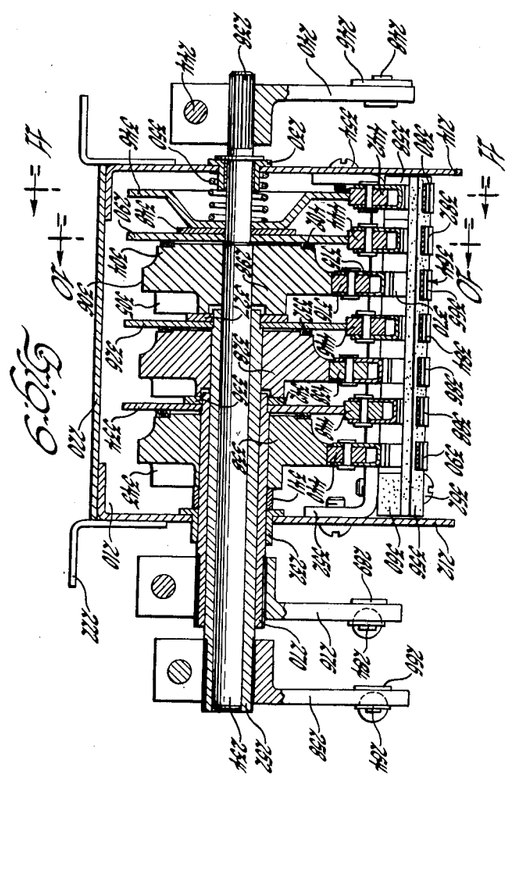
Figure 9 is a sectional view taken on the plane indicated by line 9—9 of Figure 6.

Referring now particularly to Figure 9, bushings 230 and 232 are mounted within suitable openings in side walls 212 and 214. A horizontal memory control shaft 234 is rotatably mounted in bushings 230 and 232 and terminates in a splined portion 238. A lever 240 having a split end provided with a splined bore is received on the splined portion 238 of shaft 234. A bolt 244 extends through the split end of the lever in order to fixedly secure the lever to shaft 234.

Referring now particularly to Figures 1 and 3 of the drawings, a link 246 is pivoted at one end thereof at 248 to the lever 240, with the other end of the link being pivoted at 250 to one of the levers 184. It can be seen that the link 246 will rotate the horizontal memory shaft 234 through the lever 240 upon horizontal movement of the seat.

Referring now particularly to Figure 9, a front vertical memory tube 252 is rotatably mounted upon shaft 234 and carries a lever 258 splined thereto.

Referring now particularly to Figures 1, 2 and 9 of the drawings, a cable 264 has one end thereof secured to a swivel connection 266 which is pivoted to lever 258 as can be seen in Figure 9. The other end of the cable is pivotally secured to an extension 267 of the bell crank lever 114 by a swivel connection 268 as may be seen particularly in Figure 2. It will be remembered that the bell crank lever 114 swings with the intermediate equalizer tube 110 upon vertical adjustment of the front portion of the seat. Upon occurrence of this swinging movement of the bell crank lever the cable 264 in turn will rotate the tube 252 relative to the shaft 234 by means of lever 258. The cable is mounted within a protective tube 269 as can be seen in Figure 1.

Referring now to Figure 9, a rear vertical memory control tube 270 is rotatably mounted on tube 252 for rotation about the axis of shaft 234 and carries a lever 276 splined thereto.

Referring now particularly to Figures 3 and 5 of the drawings, a cable 284 has one end thereof secured to a swivel connection 286 which is pivotally mounted on an offset bracket 288 fixedly secured at 146 to the lever 140 at the left hand side of the seat. The other end of the cable is secured to a swivel connection 289 which is pivoted to the lever 276. It will be remembered that the lever 140 swings about the axis of the equalizer rod 108 upon vertical adjustment of the rear portion of the seat. This swinging movement of the lever will cause the cable 284 to in turn rotate tube 270 about the axis of shaft 234 through the lever 276. Cable 284 is mounted within a protective tube 291 as can be seen in Figure 1.

Each of the memory control tubes and shafts has mounted thereon a seat position limit disk and a seat position memory disk, with the limit disk being fixedly secured to the shaft and the memory disk being rotatably mounted on the shaft so as to be movable independently of the shaft and the limit disk. In addition, a friction clutch means is provided between the memory disk and the limit disk so that the memory disk will always rotate with the limit disk and the shaft unless the memory disk is held against rotation.

Figure 10:
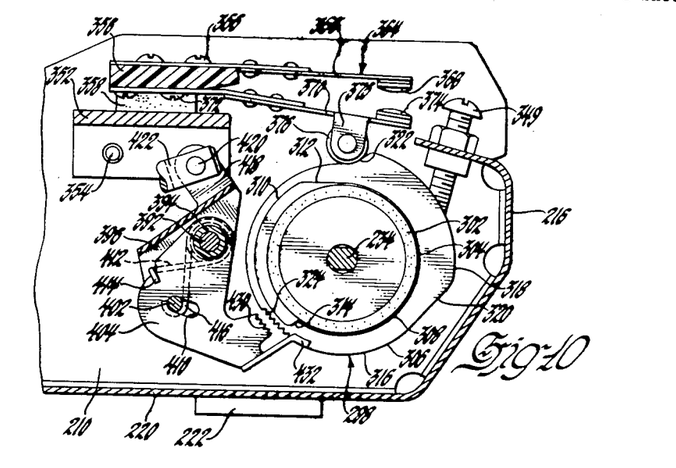
Figure 10 is a sectional view taken on the plane indicated by line 10—10 of Figure 9.
Figure 11:
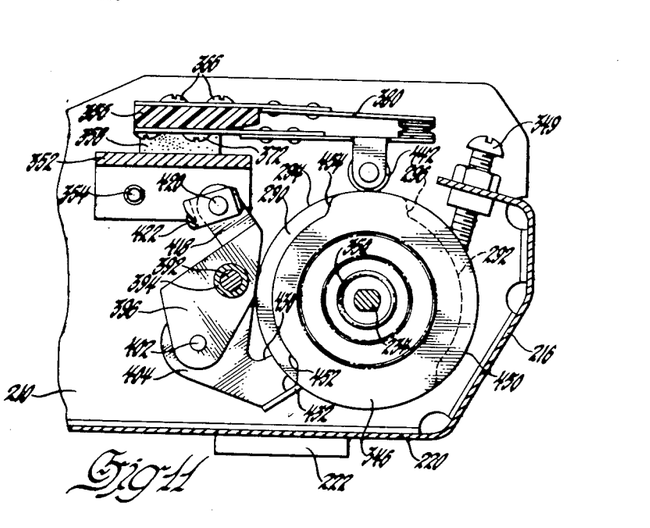
Figure 11 is a sectional view taken on the plane indicated by line 11—11 of Figure 9.

Referring now particularly to Figures 9, 10, and 11, the limit disk and the memory disk on the horizontal memory shaft will be described. The limit disk 290 is rotatable with the shaft 234 and fixes the rear horizontal terminal position of the seat as will be described. The limit disk 290 is cam shaped and includes a depressed circular portion 292 joined to an outer circular portion 294 by sloping shoulders 296. The limit disk 290 is axially slidable on shaft 234. The horizontal memory disk 298 is rotatably mounted on shaft 234 immediately adjacent disk 290 and includes a peripheral groove which mounts a friction type clutch facing 302. The memory disk 298 is stepped in cross section as may be seen in Figure 9 so as to include three cam surfaces 304, 305, and 306.

Figure 8:
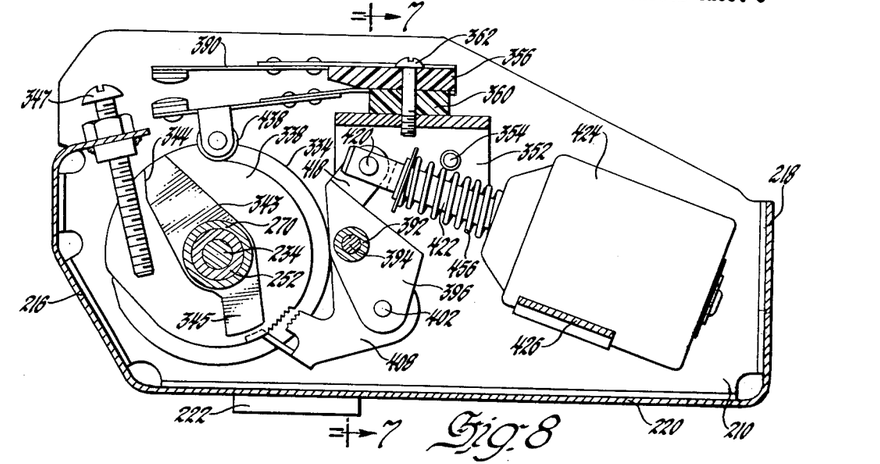
Figure 8 is a sectional view taken on the plane indicated by line 8—8 of Figure 6.

Referring now particularly to Figure 10 of the drawings, the surface 304 includes a circular portion 308 which merges into a circular portion 310 of larger diameter through a sloping shoulder 312 and an abrupt shoulder 314. The surface 306 includes a circular portion 316 which merges into a circular portion 318 of larger diameter through a sloping shoulder 320 and an abrupt shoulder 322. In addition, the circular portion 316 of surface 306 includes a serrated portion 324 for a purpose to be described. The surface 305 is identical to a similar surface 343 on memory disk 338, as seen in Figure 8, and will be described in conjunction with disk 338.

Referring now particularly to Figure 9 of the drawings, a limit disk 326 is axially slidable and rotatably fixed on tube 252. An anti-friction washer 327 is provided between limit disk 326 and the memory control disk 298. The limit disk 326 fixes the lower terminal vertical position of the front portion of the seat, as will be described, and limit disk 326 is the same in all respects as the limit disk 290. Therefore, the details of disk 326 are not shown in the drawings. A front vertical memory disk 328 is rotatably mounted on the tube 252 immediately adjacent disk 326 and includes a peripheral groove which mounts a friction type clutch facing 332. The memory disk 328 is the same in all respects to the memory disks 298 and 338 so the details are not shown in the drawings.

A limit disk 334 is axially slidable and rotatably fixed on tube 270 and determines the lower terminal vertical position of the rear portion of the seat, as will be described, and is the same in all respects as disk 290. Therefore, the details of disk 334 are not shown. An anti-friction washer 336 is provided between the disk and the memory disk 328. A rear vertical memory disk 338 is rotatably mounted on tube 270 and provided with a peripheral groove which mounts a friction type clutch facing 342. A circular spacing ring 341 fits between the memory disk 338 and bushing 232. The rear vertical memory disk 338 is the same in all respects as the memory disk 298 and includes a cam surface 343 which is identical to cam surface 305 of disk 298. The cam surface 343, as may be seen in Figure 8, has radial surfaces 344 and 345 adapted to engage an adjusting screw 347 in either direction to limit the amount of rotation of disk 338. Similar screws 349 and 351 are provided for memory disks 298 and 328.

A horizontal midway limit disk 346 is axially slidable on, but fixed to rotate with, shaft 234. A washer 348 fits between the base of the disk 346 and the disk 290 and a coil compression spring 350 extends between the side wall 214 of the housing 210 and the offset base of the disk. From an examination of Figure 9, it will be noted that the spring 350 holds the disk 346 in engagement with the washer 348 to in turn hold disk 290 in engagement with the clutch facing 302 of disk 298 and also hold disk 298 in engagement with the washer 327. The washer 327 in turn is held in engagement with disk 326 and holds this disk in firm engagement with the clutch facing 332 of disk 328. Disk 328 in turn is held in engagement with the anti-friction washer 336 to hold this washer in engagement with disk 334 and hold disk 334 in firm engagement with the clutch facing 342 of disk 338 and to hold disk 338 in engagement with ring 341. The arrangement is such that each of the limit disks must rotate with its respective shaft or tube and that each of the memory disks must rotate with its respective limit disk through the clutch facings unless the memory disk is held against rotation.

Referring now particularly to Figures 7 through 11, a U-shaped bracket 352 spans the side walls 212 and 214 and is secured thereto by means of bolts 354. A block 356 of insulation having an integral spacer 358 adjacent one end thereof is supported on bracket 352, with a separate spacer 360 being provided between the block and the bracket 352 at the other end thereof. A bolt 362 extends through the block and spacer 360 in order to secure the block to the bracket 352. The block supports a number of switches which are actuated by the limit disks and the memory disks. Since each of the switches is of the same construction only the switch 364 actuated by memory disk 298 will be particularly described. As may be seen particularly in Figure 10 the upper or fixed switch arm 365 is bolted at one end thereof to the upper surface block 356 at 366 and includes a switch contact 368. The lower or movable arm 370 of the switch is bolted at 372 at one end thereof to the lower surface of the block 356 and mounts a switch contact 374 at the other end thereof in opposition to the switch contact 368. The lower switch arm 370 further includes a depending bracket 375 which pivotally supports a roller 376. Switches 380, 382, 384, 386, 388, and 390 of the same construction as the switch 364, previously described, are provided for the horizontal midway limit disk 346, the front vertical limit disk 290, the front vertical limit disk 326, (the front vertical memory disk 328, the rear vertical limit disk 334, and the rear vertical memory disk 338, respectively.

Referring now to Figure 7 of the drawings, a shaft 392 extends between the side walls 212 and 214 of the housing and mounts a bushing 394. A U-shaped bracket 396 is provided with openings in the legs thereof to receive the bushing 394 and rotatably mount the bracket 396 on the shaft 392. A pin 402 extends between the legs of bracket 396. Three holding levers 404, 406, and 408 are rotatably mounted on the bushing 394 and are engageable with memory disks 298, 328, and 338, respectively, as will be described. Each is of the same construction and, therefore, only lever 404, will be particularly described, with reference to Figure 10. The lever is provided with slotted openings 410 which receive the pin 402. A coil torsion spring 412 is provided for each of the holding levers and is mounted on the bushing 394. One leg 414 of the spring engages the lever 404 to bias the lever in a counterclockwise direction, as viewed in Figure 10, while the other leg 416 of the spring engages the pin 402 so that one end of slot 410 is held in engagement with pin 402. The bracket 396 is further provided with a lanced out tab 418 which is pivotally secured at 420 to the armature 422 of a solenoid 424. As may be seen in Figure 6 of the drawings, the solenoid 424 is secured to a bracket 426 which is bolted at 428 to the side wall 212 of housing 210.

Referring now particularly to Figure 10 of the drawings, it will be noted that the holding lever 404 includes a serrated foot 430 which is adapted to engage the serrated portion 324 of surface 306 and a smooth foot 432 which is adapted to ride on the surface 310. The feet 430 and 432 are offset as are the surfaces 306 and 304. The raised portion 310 of the surface 304 will keep the serrated foot 430 from engaging the surface 306 when the memory disk 298 is in certain rotative positions. The spring 412 and pin and slot connection 402 and 410 between the bracket 396 and holding lever 404 provide enough lost motion for the foot 432 to ride on the surface 310 when the solenoid 424 is energized.

The memory disks 328 and 338 have holding levers 406 and 408 with springs 434 and 436, as may be seen in Figure 7, similar to those provided for the memory disk 298. The switches 386 and 390 are operated by rollers 438 and 440 from the memory disks 328 and 338, as may be seen in Figure 9, just as the switch 364 is operated by the roller 376 from the memory disk 298.

Referring now particularly to Figures 9 and 11, it is noted that the switch 380 is opened and closed by the horizontal midway position limit disk 346 by a roller 442 that rides thereon. The terminal position limit disks 290, 326 and 334 operate the switches 382, 384, and 388 by way of similar rollers 444, 446, and 448. The midway limit disk 346 has a circular surface 450 which joins a smaller diameter circular surface 452 through shoulders 454.

The solenoid armature 422 is biased by a compression spring 456, as may be seen in Figure 8, and when energized overcomes the spring to swing the bracket 396 about the shaft 392 in a clockwise direction. The bracket 396 thereupon swings the holding levers 404, 406, and 408 into engagement with the memory disks 298, 328, and 338. The serrations on the holding levers 404, 406, and 408 must engage the serrations on the memory disks 298, 328, and 338 to keep the memory disks from rotating with the limit disks 290, 326, and 334. Referring to Figure 10, it is noted that the serrations 324 on the memory disk 298 are aligned with the serrations 430 on the holding lever 404 in only one rotative position of the memory disk, namely, the position where the switch 264 is open with the memory disk reflecting the desired seat position in the horizontal sense. If the memory disk 298 is counterclockwise of the desired position the foot 432 prevents the serrations from engaging and the memory disk will follow the limit disk movement until the serrations are aligned. If the memory disk 298 is clockwise of the desired position the teeth 430 on the holding lever 404 will slidably engage the smooth surface 316 and the memory disk will follow the limit disk movement until the serrations are aligned. It is this construction that enables an automatic sequence to be interrupted by manual control without disturbing the desired seat position that was stored by the memory disks before the automatic sequence began, providing the interruption does not carry the seat past such stored position which latter occurrence would establish a new desired seat position. The arrangement for the memory disks 328 and 338 and holding levers 406 and 408 is the same as that described for memory disk 298 and holding lever 404.

Figure 12:
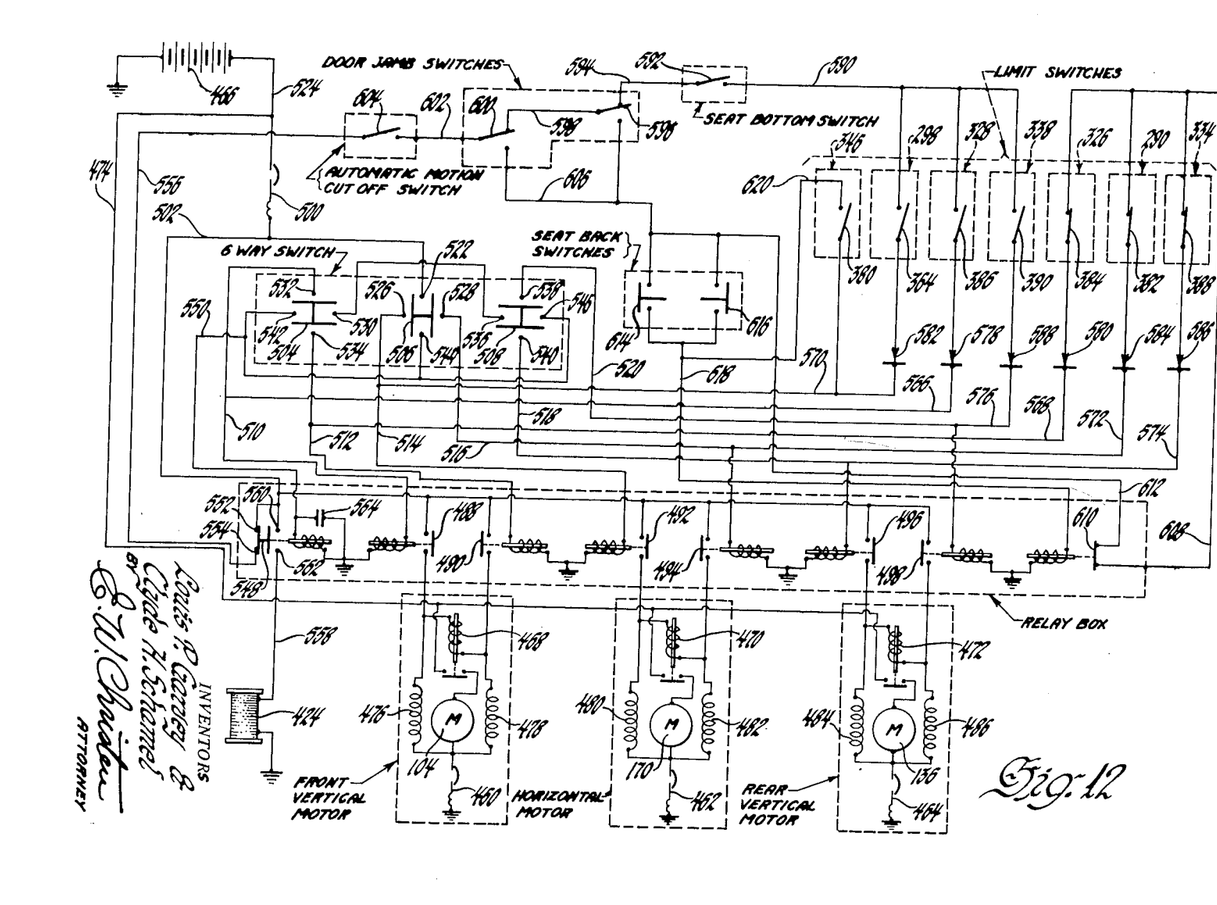
Figure 12 is a circuit diagram.

Referring now particularly to Figure 12, the reversible motors 104, 170 and 136 are grounded through protective circuit breakers 460, 462, and 464 and have their armatures connected to a vehicle battery 466 through field current operated relays 468, 470, and 472 and line 474. The front vertical motor 104 has a shunt field winding 476 to raise the front of the seat and a winding 478 to lower it. The horizontal motor 170 has a winding 480 to power the seat forwardly and a winding 482 to power it rearwardly. The rear vertical motor has a winding 484 to raise the rear of the seat and a winding 486 to lower it. Relays 488, 490, 492, 494, 496, and 498 connect the windings to the battery 466 through a protective circuit breaker 500 and a line 502. Relays 468, 470, and 472 are energized to provide armature current when either winding of the particular motor is energized.

Relays 488 and 490 thus provide up and down control for the front portion of the seat, relays 492 and 494 provide fore and aft control for the entire seat and relays 496 and 498 provide up and down control for the rear portion of the seat.

Manually operable switches 504, 506, and 508 provide individual control for the relays 488, 490, 492, 494, 496, and 498 and connect them to the battery 466 by lines 510, 512, 514, 516, 518, and 520. The switches 504, 506, and 508 are conventional two-way toggle switches which are spring biased to a normally open position. If the operator of the vehicle desires to move the seat forward, he shifts horizontal switch 506 to the left to connect contact 522 of the battery line 524 with the contact 526 of the solenoid line 514 of the forward motion relay 492. Movement of the horizontal switch 506 to the right connects the contact 522 with the contact 528 of the solenoid line 516 of the aft motion relay 494. The front vertical switch 504 has a like battery contact 530 and up and down contacts 532 and 534 and the rear vertical switch 508 has a like battery contact 536 and up and down contacts 538 and 540. The manual switches 504, 506, and 508 provide direct control for the seat that will override the automatic controls, to be described, and will operate the seat to the mechanical limits of its travel.

When the manual switches 504, 506, and 508 are moved in either direction they also connect contacts 542, 544, and 546 to the battery 466 and any of these contacts then energizes the solenoid of a relay 548 through line 550. The relay 548 is spring biased to normally connect contacts 552 and 554 whereby a line 556 for the automatic circuit control is provided with battery power from the line 502 whenever the switches 504, 506, and 508 are in neutral position. The relay 548 is energized whenever the switches 504, 506, and 508 are operated to break the power to line 556 and connect the holding lever solenoid 424 to the battery 466 through lines 524, 502, and 558 and contacts 560 and 562. A condenser 564 is connected across the solenoid of the relay 548 to provide a slight time delay on the return of the relay 548 when the circuit to the relay solenoid is broken. This accommodates for slight mechanical coast in the seat mechanism.

Referring to Figures 6 through 11, it will be remembered that the solenoid 424 overcomes the spring 456 when energized and swings the bracket 396 to simultaneously move the holding levers 404, 406, and 408 into engagement with the serrated portions of the memory disks 298, 328, and 338. Thus it is seen that the memory disks 298, 328, and 338 are all held against rotation whenever any one of the manual switches 504, 506, and 508 is operated providing the serrations on the holding levers and memory disks are aligned. It will be recalled that the limit disks 290, 326, and 334 directly follow the seat movements at all times and that the memory disks 298, 328, and 338 are only frictionally coupled thereto. Since the memory disks are held against rotation whenever the manual switches are operated without interrupting an automatic cycle, they will then assume a new relation in the rotational sense to the limit disks. The memory disks will, however, follow the limit disks through the frictional couplings whenever the seat is automatically operated as the relay 548 deenergizes the solenoid 424 whenever manual operation is discontinued.

The limit disks 290, 326, and 334 provide a fixed terminal travel position for the seat in the rearward and downward position by opening the switches 382, 384, and 388 when in that terminal position. The memory disks 298, 328, and 338 provide variable forward and upward desired positions for the seat by opening the switches 364, 386, and 390 and such desired positions are changed by way of the holding levers 404, 406, and 408. The midway limit disk 380 provides a fixed horizontal midway position for the seat by opening the switch 380 when the seat is moved to a midway position.

Referring now particularly to Figures 10 and 11, the horizontal memory disk 298 and limit disk 290 rotate in a counter-clockwise direction whenever the seat moves rearwardly under automatic control and the switch 364 opens when the roller 376 rides down the shoulder 322 from the surface 318 to rest on the surface 316. The switch 364 is closed whenever the roller 376 rides the surface 318 and, if the memory circuit is properly armed, will energize the horizontal motor 170 to move the seat in a forward direction until the roller 376 rides down the shoulder 322. Since the memory disk 298 is only frictionally coupled to the limit disk 290 to follow the fore and aft motion of the seat, it is readily seen that the position of the memory disk 298 can be varied relative to the limit disk and seat position by shifting the seat through the manual control so that the memory disk is restrained against rotation by the holding lever 404. As noted previously, the serrated teeth 430 of the holding lever 404 can only engage the teeth 324 on the memory disk 298 in the one position shown in Figure 10, namely, when the memory switch 364 is open. This action is provided in order that a manual control interruption of an automatic positioning cycle will be ineffective to reset the memory disk 298 to a new position unless the seat is moved past the reference position.

Referring now particularly to Figure 11, the horizontal terminal limit disk 290 rotates counter-clockwise as the seat moves rearwardly and the limit switch 382, which is immediately behind the shown limit switch 380, will open as the switch roller rides down the shoulder 296 from the surface 294 to the surface 292. The motor 170 is energized to move the seat in the aft direction whenever the switch 382 is closed, if other circuit conditions are met. The stop surface 305 (Figure 9) and the adjustment screw 349 (Figure 6) provide an initial adjustment at installation to determine the range of permissible rotation of the memory disk 298.

The automatic switch arrangements for the front vertical limit disk 326 and memory disk 328 and for the rear vertical limit disk 334 and memory disk 338 are similar to that described in conjunction with the automatic horizontal switch arrangement.

The automatic horizontal switch arrangement also includes the midway position limit switch 380 which opens whenever the seat is in the forward half of its horizontal motion. The horizontal midway position limit disk 346 is shown in Figure 11 with the seat in the rearward half portion of its travel and the roller 442 of the switch 380 then rides on the surface 450. Forward motion of the seat will rotate the midway limit disk 346 clockwise whereupon the roller 442 will ride down the shoulder 454 and on to the smaller diameter surface 452 to open the switch 380. When the switch 380 is closed the horizontal motor 170 is energized to power the seat in a forward direction, if other circuit conditions are met.

Referring again to Figure 12, the motor relays 488, 490, 492, 494, 496, and 498 are provided with automatic solenoid energization from the respective memory and limit switches 386, 384, 364, 382, 388, and 390 by way of lines 566, 568, 570, 572, 574, and 576 and rectifiers 578, 580, 582, 584, 586, and 588. The horizontal motor relay 492 is also energized by the midway limit switch 380 through line 570. The memory switches 364, 386, and 390 are open whenever the seat has returned to the position it held prior to automatic operation. The memory switches connect to the battery 466 through a line 590, a seat bottom switch 592, a line 594, a right door jamb switch 596, a line 598, a left door jamb switch 600, a line 602, a manually operable automatic motion cutoff switch 604, the line 556, the circuit relay 548, the line 502, and the line 524. The seat bottom switch 592 is biased to the open position and suitably arranged for closure under the weight of the driver. The door jamb switches 600 and 596 are shown in the door closed position and break the circuit to the memory switches whenever a door is opened. The door jamb switches close another circuit, to be described, through a line 606 whenever a door is opened. The automatic motion cutoff switch 604 is conveniently located with the other manual switches on the instrument panel or at the side of the seat.

Thus it is seen that the memory switches 364, 386, and 390 can only operate the motors for automatic seat adjustment when the driver is seated, when both doors are closed, when the manual switch 604 is positioned for automatic operation, and when the relay 548 is de-energized as a consequence of the manual switches 504, 506, and 508 being in the neutral position. If these conditions are met and the switches 364, 386 and 390 are closed (due to displacement of the memory disks 298, 328, and 388 as a result of the seat moving to a terminal position because of a door opening or operation of a seat back switch), the motors 170, 134, and 136 will be energized by way of relays 492, 488, and 496 to return the seat to the desired position, i.e., the previous manually chosen position.

The terminal position limit switches 382, 384, and 388 are open when the seat is in the full rearward and down position and are otherwise closed and connect to the battery 466 by way of a line 608, relay 610, line 612, the line 606, either of the door jamb switches 596 and 600, the automatic motion cutoff switch 604, and the relay 548. The relay 610 is normally closed so that the limit switches 382, 384, and 388 will move the seat rearward and downward by ways of the motor relays 494, 490, and 498 whenever either door is opened with the seat in a forward and up position providing the manual switch 604 is closed and the relay 548 is deenergized. The terminal position limit switch relay 610 can be opened at will to stop such rearward and downward motion by a rear seat passenger through manual operation of either of a pair of seat back switches 614 and 616 which are conveniently located on the back of the seat. The seat back switches 614 and 616 are normally biased to open position. Either switch, when closed, will energize the solenoid of the relay 610 through a line 618 to open the terminal position circuit and simultaneously supply current through a line 620 to the midway horizontal position limit switch 380. If the midway limit switch 380 is closed because of the seat being in the rearward half portion of its travel the motor relay 492 is then energized by way of lines 514 and 570 so that the motor 170 will move the seat forward to the horizontal midway position.

*Operation*

Assume that the driver has the automatic motion cutoff switch 604 closed and has the seat adjusted to a desired position and then desires to leave the vehicle. When the driver opens the left door, the left door jamb switch 600 opens the memory switch circuits and closes the limit switch circuits. If the seat is out of the terminal position one or more of the limit switches 382, 384, and 388 will be closed and will energize the solenoids of the respective motor relays 494, 490, and 498 to supply current to the respective motors 170, 134, and 136 through the line 502 whereupon the motors will shift the seat to the terminal position. When the seat reaches the terminal position the limit disks 290, 326, and 334 will open the limit switches 382, 384, and 388 to stop the seat and driver can depart from the vehicle with ease. On departure from the vehicle, the driver may close the left door whereupon the door jamb switch 600 is again connected in the memory switch circuit. However, the seat bottom switch 592 is now open as the seat is unoccupied and consequentially the memory switch circuit does not operate to move the seat from the terminal position.

When the driver returns to the vehicle, his entry is facilitated as the seat is in the terminal position. He closes the seat bottom switch 592 on being seated and moves the door jamb switch 600 with door closure to close the memory switch circuit. The solenoids of the motor relays 492, 488, and 496 are thus energized by the respective memory switches 364, 386, and 390 which are closed since the memory disks 298, 328, and 388 were displaced by the movement to terminal position. The motors 170, 134, and 136 are thereupon energized through the line 502 to shift the seat to the position previously set by the driver, the memory switches 364, 386, and 390 opening to stop motors when the previous position is obtained.

Should the driver wish to change seat position, he need only manipulate the manual switches 506, 504, and 508 to obtain a new position. While the motors 170, 134, and 136 are shifting the seat, the solenoid of the relay 548 is energized whereupon the solenoid 424 is also energized through lines 502 and 558 to engage the holding levers 404, 406, and 408 with the memory disks 298, 328, 338 and thereby restrain the memory disks against rotation. The memory disks now set up a new desired or reference position of seat adjustment and the seat will then operate from the new reference position to the terminal position should the driver again leave the vehicle in the manner previously described.

Should a rear seat passenger desire an easier exit from the vehicle following the opening of either door and movement of the seat to the terminal position, he need only operate one of the seat back switches 614 and 616 whereupon the relay 610 is energized to break the circuit to the limit switches 382, 384, and 388 and close the circuit to the midway horizontal limit switch 380 by the line 620. The midway limit disk 346 will maintain the limit switch 380 closed and thus energize the solenoid of the motor relay 492 through the lines 514 and 570 until the motor 170 has shifted the seat forward to the midway position. On release of the seat back switch 614 or 616 with the door open, the terminal position limit switches 382, 384, and 388 will again resume control to move the seat to the terminal position and, when the door is closed, the memory switches 364, 386, and 390 will resume control to move the seat to the reference position which was last set by the driver.

If for any reason the driver should desire to cut off the automatic control afforded by the memory switches and limit switches, he need only open the cutoff switch 604 and the seat will remain fixed in position. Alternatively the driver may override the automatic control by manipulating any or all of the manual switches 504, 506, and 508 which will energize the solenoid of the relay 548 to disconnect the automatic control circuit from the battery. If the driver thus interrupts the automatic control, he may or may not change the reference position set by the memory disks 298, 328, and 338. The solenoid 424 is energized during such interruptions but holding levers 404, 406 and 408 are ineffective to hold the memory cams against rotation whenever the serrations are out of alignment so a new reference position will be obtained only when the interruption moves the seat past the old reference position.

While the embodiment of the invention here described is preferred other embodiments may be made within the scope of the invention.

We claim:

1. In combination with a vehicle, a body including a seat and a door, the seat being mounted on the body by a seat position adjusting mechanism, a power actuator connected with the mechanism for displacing the seat in the body, a manually operable control for energization of the power actuator to displace the seat to various positions, means for storing information of a predetermined terminal position and of a particular selected position, and door actuable means associated with the storage means and responsive to door opening and door closing for energizing the power actuator to displace the seat to the terminal position and to the selected position respectively providing the manually operable control is inactive, said door actuable means and said storage means providing an automatic control for said seat, the automatic control afforded by the door actuable means and storage means being interrupted whenever the manually operable control is activated, displacement of the seat from the selected position through operation of the manually operable control being effective to establish a new selected position whenever the automatic control is inactive.

2. In combination with a vehicle, a body including a seat and a door, the seat being mounted on the body by a seat position adjusting mechanism, a power actuator connected with the mechanism for displacing the seat in the body, a manually operable control for energization of the power actuator to displace the seat to various positions, means for storing information of a predetermined terminal position and of a particular selected position, and door actuable means associated with the storage means and responsive to door opening and door closing for energizing the power actuator to displace the seat to the terminal position and to the selected position respectively providing the driver is seated and the manually operable control is inactive, said door actuable means and said storage means providing an automatic control for said seat, the automatic control afforded by the door actuable means and storage means being interrupted whenever the manually operable control is activated, displacement of the seat from the selected position through operation of the manually operable control being effective to establish a new selected position whenever the automatic control is inactive.

3. In combination with a vehicle, a body including a seat and a door, the seat being mounted on the body by a seat position adjusting mechanism, a power actuator connected with the mechanism for displacing the seat in the body, a manually operable control for energization of the power actuator to displace the seat to various positions, means for storing information of a predetermined terminal position and of a particular selected position, door actuable means associated with the storage means and responsive to door opening and door closing for energizing the power actuator to displace the seat to the terminal position and to the selected position respectively providing the driver is seated and the manually operable control is inactive, said door actuable means and said storage means providing an automatic control for said seat, the automatic control afforded by the door actuable means and storage means being interrupted whenever the manually operable control is activated, displacement of the seat from the selected position through operation of the manually operable control being effective to establish a new selected position whenever the automatic control is inactive, and a second manually operable control for preventing the door actuable means from energizing the power actuator.

4. In combination with a vehicle, a body including a seat and a door, the seat being mounted on the body by a seat position adjusting mechanism, a power actuator connected with the mechanism for displacing the seat in the body, a manually operable control for energization of the power actuator to displace the seat to various positions, means for storing information of a predetermined terminal position and of a particular selected position, and door actuable means associated with the storage means and responsive to door opening and door closing for energizing the power actuator to displace the seat to the terminal position and to the selected position respectively, said door actuable means and said storage means providing an automatic control for said seat, the automatic control afforded by the door actuable means and storage means being interrupted whenever the manually operable control is activated.

5. In combination with a vehicle, a body including a seat and a door, the seat being mounted on the body by a seat position adjusting mechanism, a reversible electric motor connected with the mechanism for displacing the seat in the body, a manually operable control for energization of the motor to displace the seat to various positions, cam and switch means for storing information of a predetermined terminal position and of a particular selected position, and door actuable switch means associated with the cam and switch storage means and responsive to door opening for energizing the motor in one direction to displace the seat to the terminal position and responsive to door closing for energizing the motor in the other direction to displace the seat to the selected position providing the driver is seated and the manually operable control is inactive, said door actuable means and said storage means providing an automatic control for said seat, the automatic control afforded by the door actuable means and storage means being interrupted whenever the manually operable control is activated, displacement of the seat from the selected position through operation of the manually operable control being effective to establish a new selected position whenever the automatic control is inactive.

6. In combination with a vehicle, a body including a seat and a door, the seat being mounted on the body by a seat position adjusting mechanism that provides selective horizontal, vertical and tilt adjustment, a power actuator connected with the mechanism for displacing the seat in the body, a manually operable control for energization of the power actuator to displace the seat to the various positions of adjustment, means for storing information of a predetermined terminal rearward and downward positions and of a particular selected position at any point in the adjustment range of the seat mechanism, and door actuable means operatively connected with the storage means and responsive to door opening and door closing for energizing the power actuator to displace the seat to the terminal position and to the selected position respectively providing the manually operable control is inactive, said door actuable means and said storage means providing an automatic control for said seat, the automatic control afforded by the door actuable means and storage means being interrupted whenever the manually operable control is activated, displacement of the seat from the selected position through operation of the manually operable control being effective to establish a new selected position whenever the automatic control is inactive.

7. In combination with a vehicle, a body including a seat and a door, the seat being mounted on the body by a seat position adjusting the mechanism that provides selective horizontal, vertical and tilt adjustment, a power actuator connected with the mechanism for displacing the seat in the body, a manually operable control for energization of the power actuator to displace the seat to the various positions of adjustment, means for storing information of a predetermined terminal rearward and downward position and of a particular selected position at any point in the adjustment range of the seat mechanism, and door actuable means operatively connected with the storage means and responsive to door opening and door closing for energizing the power actuator to displace the seat to the terminal position and to the selected position respectively, said door actuable means and said storage means providing an automatic control for said seat, the automatic control afforded by the door actuable means and storage means being interrupted whenever the manually operable control is activated.

8. In combination with a vehicle, a body including a seat and a door, the seat being mounted on the body by a seat position adjusting mechanism, a power actuator connected with the mechanism for displacing the seat in the body, a manually operable control for energization of the power actuator to displace the seat to various positions, first cam means following seat displacements and storing information of a predetermined terminal rearward position, second cam means frictionally coupled to the first cam means and storing information of a particular selected position, brake means for holding the second cam means from movement with the first cam means, and door actuable means connected with the storage means and responsive to door opening and door closing providing the driver is seated and the manually operable control is inactive for energizing the power actuator to displace the seat to the terminal position set by the first cam means and to the selected position set by the second cam means respectively, said door actuable means and said storage means providing an automatic control for said seat, the automatic control afforded by the door actuable means and storage means being interrupted whenever the manually operable control is activated, the brake means being effective to establish a selected position when the manually operable control is active with the door actuable means inactive.

9. In combination with a vehicle, a body including a seat and a door, the seat being mounted on the body by a seat position adjusting mechanism that provides selective horizontal, vertical and tilt adjustment, a power actuator connected with the mechanism for displacing the seat in the body, a manually operable control for energization of the power actuator to displace the seat to the various positions of adjustment, first plural cam means following seat displacement and storing information of a predetermined terminal rearward and downward position, second plural cam means frictionally coupled to the first cam means and storing information of a particular selected position at any point in the adjustment range of the seat mechanism, plural brake means for holding the second cam means from movement with the first cam means, and door actuable means connected with the storage means and responsive to door opening and door closing providing the driver is seated and the manually operable control is inactive for energizing the power actuator to displace the seat to the terminal position set by the first cam means and to the selected position set by the second cam means respectively, said door actuable means and said storage means providing an automatic control for said seat, the automatic control afforded by the door actuable means and storage means being interrupted whenever the manually operable control is activated, the brake means being effective to establish a selected position when the manually operable control is active with the door actuable means inactive.

10. In Combination with a vehicle having a door, a seat movable to various positions including a predetermined terminal position and a preselected position that is subject to change, power means for moving the seat, automatic control means for the power means and responsive to door and seat positions to move the seat to the terminal position when the door is open and to move the seat to the preselected position when the door is closed, and manually operable control means for the power means to move the seat to a desired position and effective to temporarily interrupt the movement of the seat under the direction of the automatic control means without altering the preselected position providing the seat is not moved past such preselected position, the manually operable control means being effective to establish the desired position as a new preselected position whenever there is no temporary interruption of seat movement under the direction of the automatic control means.

11. In combination with a vehicle having a door, a seat movable horizontally, vertically and tiltable to various positions including a predetermined downward and rearward terminal position and a preselected position that is subject to change, power means for moving the seat, automatic control means for the power means and responsive to door and seat positions, providing the vehicle driver is seated, to move the seat to the terminal position when the door is open and to move the seat to the preselected position when the door is closed, manually operable control means for the power means to move the seat to a desired position and effective to temporarily interrupt the movement of the seat under the direction of the automatic control means without altering the preselected position providing the seat is not moved past such preselected position, the manually operable control means being effective to establish the desired position as a new preselected position whenever there is no temporary interruption of seat movement under the direction of the automatic control means, and other manually operable means to terminate control by the automatic control means.

12. In combination with a vehicle having a door, a seat movable to various positions including first and second predetermined terminal positions and a preselected position that is subject to change, power means for moving the seat, automatic control means for the power means and responsive to door and seat positions to move the seat to the first terminal position when the door is open and to move the seat to the preselected position when the door is closed, secondary manually operable control means for the power means to move the seat to the second terminal position providing the door is open and effective to temporarily interrupt the movement of the seat under the direction of the automatic control means without altering the preselected position providing the seat is not moved past such preselected position, and primary manually operable control means for the power means to move the seat to a desired position and effective to temporarily interrupt the movement of the seat under the direction of the automatic control means and the secondary manually operable control means without altering the preselected position providing the seat is not moved past such preselected position, the primary manually operable control means being effective to establish the desired position as a new preselected position whenever there is no temporary interruption of seat movement under the direction of the automatic control means and the secondary manually operable control means.

13. In combination with a vehicle having a door, a seat movable to various positions including first and second predetermined terminal positions and a preselected position that is subject to change, power means for moving the seat, automatic control means for the power means and responsive to door and seat positions, providing the vehicle driver is seated, to move the seat to the first terminal position when the door is open and to move the seat to the preselected position when the door is closed, secondary manually operable control means for the power means to move the seat to the second terminal position providing the door is open and effective to temporarily interrupt the movement of the seat under the direction of the automatic control means without altering the preselected position providing the seat is not moved past such preselected position, and primary manually operable control means for the power means to move the seat to a desired position and effective to temporarily interrupt the movement of the seat under the direction of the automatic control means and the secondary manually operable control means without altering the preselected position providing the seat is not moved past such preselected position, the primary manually operable control means being effective to establish the desired position as a new preselected position whenever there is no temporary interruption of seat movement under the direction of the automatic control means and the secondary manually operable control means.

14. In combination with a vehicle having a door, a seat movable horizontally, vertically and tiltable to various positions including first and second predetermined terminal positions and a preselected position that is subject to change, the first terminal position being the downward and rearward limit of seat travel, the second terminal position being a horizontal midpoint of seat travel, power means for moving the seat, automatic control means for the power means and responsive to door and seat positions, providing the vehicle driver is seated, to move the seat to the first terminal position when the door is open and to move the seat to the preselected position when the door is closed, secondary manually operable control means for the power means to move the seat to the second terminal position providing the door is open and effective to temporarily interrupt the movement of the seat under the direction of the automatic control means without altering the preselected position providing the seat is not moved past such preselected position, primary manually operable control means for the power means to move the seat to a desired position and effective to temporarily interrupt the movement of the seat under the direction of the automatic control means and the secondary manually operable control means without altering the preselected position providing the seat is not moved past such preselected position, the primary manually operable control means being effective to establish the desired position as a new preselected position whenever there is no temporary interruption of seat movement under the direction of the automatic control means and the secondary manually operable control means, and other manually operable means to terminate control by the automatic control means and the secondary manually operable control means.

15. In combination with a vehicle body including a seat and a door, the seat being mounted on the body by a seat position adjusting mechanism, a power actuator connected with the mechanism for displacing the seat fore and aft in the body, a position limit cam adapted to follow the movements of the seat, a position memory cam adapted to follow the movements of the seat under certain conditions and to change positions with respect to the seat under other conditions, automatic control means connected with the cams and door and responsive to changes in position of the cams and door for causing energization of the power actuator, the automatic control means responding on door opening to the position of the limit cam to energize the power actuator and shift the seat rearward and responding on door closing to the position of the memory cam to energize the power actuator and shift the seat to the position held prior to rearward movement, and manually operable control means for energizing the power actuator and interrupting the influence of the automatic control means under any condition.

16. In combination with a vehicle body including a seat and a door, said seat being mounted on the body by a seat position adjusting mechanism, a power actuator connected with the mechanism for displacing the seat to various positions in the body, position limit cam means adapted to follow the seat throughout its range of movement, position memory cam means adapted to follow the limit cam means through a frictional coupling, stop means registrable with a localized area of the memory cam means to prevent the memory cam means from following the limit cam means, automatic control means connected with the cam means and door and responsive to changes in position of the cam means and door to energize the power actuator, the automatic control means responding on door opening to the position of the limit cam means to energize the power actuator and shift the seat rearward and responding on door closing to the position of the memory cam means to energize the power actuator and shift the seat to the position held prior to door opening, and manually operable control means for energizing the power actuator at any time and effective to interrupt the influence of the automatic control means under any condition, the manually operable control means serving to actuate the stop means to reposition the memory cam means with respect to the limit cam means.

References Cited in the file of this patent

UNITED STATES PATENTS

| | | |
|---|---|---|
| 2,715,433 | Dolgorukov | Aug. 16, 1955 |
| 2,805,702 | Appleton | Sept. 10, 1957 |
| 2,809,862 | Daniels | Oct. 15, 1957 |
| 2,823,949 | Williams et al. | Feb. 18, 1958 |
| 2,829,002 | Leavengood et al. | Apr. 1, 1958 |